W. B. WIGLE.
PUMP PACKING EXPANDER.
APPLICATION FILED FEB. 6, 1917.
1,243,648.
Patented Oct. 16, 1917.
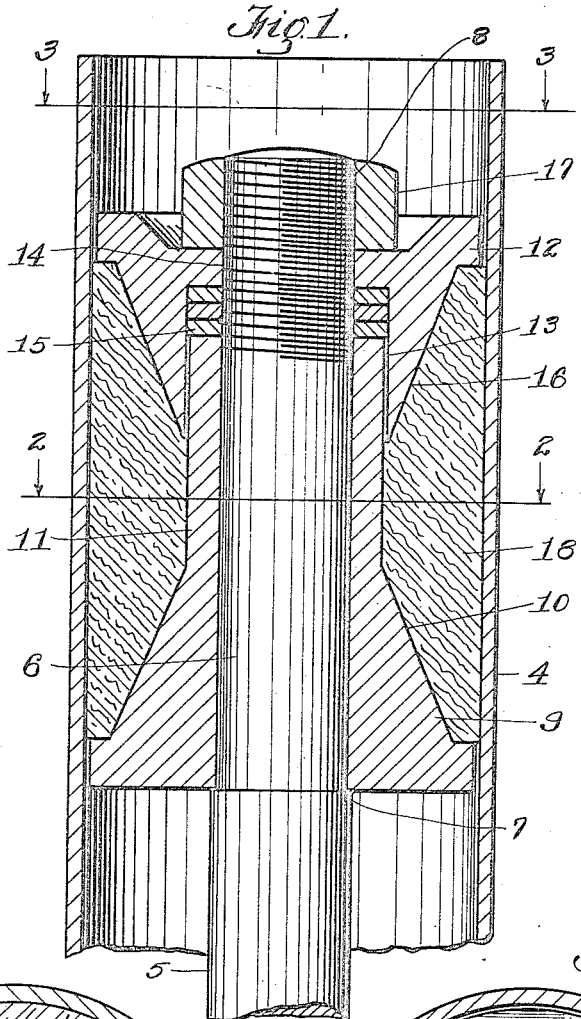
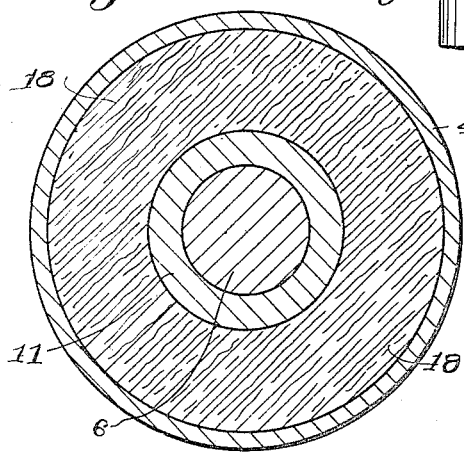
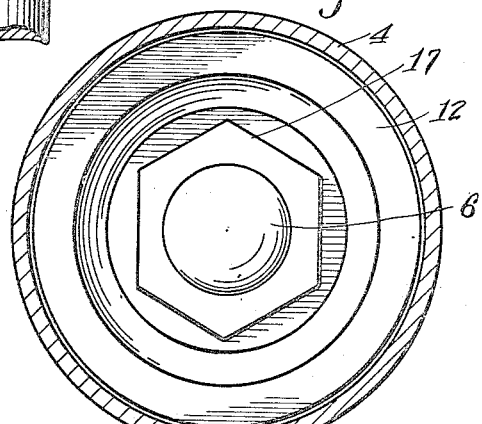
Inventor
Wilson B. Wigle

UNITED STATES PATENT OFFICE.

WILSON B. WIGLE, OF FULLERTON, CALIFORNIA.

PUMP-PACKING EXPANDER.

1,243,648.                    Specification of Letters Patent.    Patented Oct. 16, 1917.

Application filed February 6, 1917. Serial No. 146,993.

*To all whom it may concern:*

Be it known that I, WILSON B. WIGLE, a citizen of the Dominion of Canada, residing at Fullerton, in the county of Orange, State of California, have invented new and useful Improvements in Pump-Packing Expanders, of which the following is a specification.

This invention relates to a piston and packing therefor.

It is an object to provide a piston having an expansible packing which may be adjusted to compensate for wear and to adapt it to pump barrels of different diameters.

An embodiment of my invention is illustrated in the accompanying drawing, in which:

Figure 1 is an axial section through a pump liner and piston.

Fig. 2 is a section as seen on the line 2—2 of Fig. 1.

Fig. 3 is a section as seen on the line 3—3 of Fig. 1.

Referring more particularly to the drawing, 4 indicates a pump liner, within which is disposed a piston. A piston rod 5 has a portion of reduced diameter indicated by 6. Formed upon the rod between the portion of reduced diameter and the portion of enlarged diameter is a shoulder 7, which serves as an abutment for the piston body. The end of rod 5 is threaded as indicated at 8 to receive a nut 17.

The piston comprises a body portion 9 provided with a bore in which the portion 6 of the piston rod is disposed. The flat face of the body 9 abuts against the shoulder 7. A flaring inclined face 10 is provided on the peripheral portion of the body, and a cylindrical extension 11.

Mounted upon the reduced portion 6 of the piston rod is a follower 12. The follower 12 is provided with a bore having a portion 13 of a diameter equal to the cylindrical portion 11 of the body. This bore is reduced in diameter to equal that of the portion 6 of the piston rod, as indicated by 14. The follower is disposed over the cylindrical portion 11. Mounted between the body and the follower in the bore 13 of the follower is a plurality of rings 15, herein shown as 3 in number. A surface 16 of the follower is inclined and opposed to the inclined surface 10 on the body. Mounted upon the threaded end of the piston rod is a nut 17, which holds the follower against the rings 15. It will be noted that the follower and piston body form a structure of spool form, in the groove of which is disposed a resilient packing, preferably of rubber. This packing is indicated by 18.

It is obvious that as the follower is moved toward the piston body, the packing 18 is compressed and expanded. As the packing wears away and the fit becomes loose it is necessary to expand the packing which may be done in the following manner:

The nut 17 is removed from the piston rod and the follower slipped therefrom. One of the rings 15 is then removed and the follower again placed in position upon the rod. The nut 17 is then tightened to force the follower against the ring 15, thereby expanding the packing 18 and increasing the diameter of the piston.

What I claim is:

1. In a piston, the combination of a piston rod, a body secured thereto, a piston follower mounted on said rod for adjustment to and from said body, said body and follower provided with opposed inclined surfaces forming walls of a packing recess, packing in said recess, spacing rings interposed between said body and follower to adjust the distance between said inclined surfaces, and means to lock said follower in position.

2. In a piston, the combination of a piston rod, a piston body secured thereto, said body comprising a cylindrical portion and a portion flaring outwardly from the cylindrical portion, thereby providing an inclined surface, a piston follower mounted on said rod for adjustment to and from said body, said follower telescopically mounted with respect to said body and provided with an inclined surface opposed to said first mentioned inclined surface, spacing rings mounted on said rod between the body and follower, and means to lock said follower in position.

In witness that I claim the foregoing I have hereunto subscribed my name this 9th day of January, 1917.

WILSON B. WIGLE.